United States Patent
Roberts

(10) Patent No.: US 10,815,933 B2
(45) Date of Patent: Oct. 27, 2020

(54) VARIABLE AREA FAN NOZZLE ACTUATION SYSTEM

(71) Applicant: Rohr, Inc., Chula Vista, CA (US)

(72) Inventor: Stephen M. Roberts, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 292 days.

(21) Appl. No.: 16/016,295

(22) Filed: Jun. 22, 2018

(65) Prior Publication Data

US 2018/0298845 A1    Oct. 18, 2018

Related U.S. Application Data

(62) Division of application No. 14/713,961, filed on May 15, 2014, now Pat. No. 10,030,608.

(51) Int. Cl.

| | |
|---|---|
| *F02K 1/72* | (2006.01) |
| *H02G 11/00* | (2006.01) |
| *F02K 3/04* | (2006.01) |
| *F02K 1/80* | (2006.01) |
| *E05D 11/00* | (2006.01) |
| *B64C 9/36* | (2006.01) |
| *F02K 1/76* | (2006.01) |
| *F02K 1/09* | (2006.01) |

(Continued)

(52) U.S. Cl.
CPC .............. *F02K 3/04* (2013.01); *B64C 9/36* (2013.01); *E05D 11/0081* (2013.01); *F02K 1/09* (2013.01); *F02K 1/72* (2013.01); *F02K 1/763* (2013.01); *F02K 1/80* (2013.01); *F15B 7/06* (2013.01); *F15B 21/00* (2013.01); *H02G 11/006* (2013.01); *F05D 2260/50* (2013.01)

(58) Field of Classification Search
CPC ..... F02K 1/09; F02K 1/70; F02K 1/72; F02K 1/76; F02K 1/763; F02K 1/80; F02K 1/605; F02K 1/625; H02G 3/0608; H02G 11/00; H02G 11/06; B64C 9/34; B64C 9/36; B64C 9/02; B60R 16/0215; F16L 3/015
See application file for complete search history.

(56) References Cited

U.S. PATENT DOCUMENTS

| | | |
|---|---|---|
| 3,829,020 A | 8/1974 | Stearns |
| 3,831,376 A | 8/1974 | Moorehead |

(Continued)

OTHER PUBLICATIONS

Non-Final Office Action Issued in U.S. Appl. No. 14/713,961 dated Sep. 20, 2017.

(Continued)

*Primary Examiner* — Gerald L Sung
*Assistant Examiner* — Rene D Ford
(74) *Attorney, Agent, or Firm* — Snell & Wilmer, L.L.P.

(57) ABSTRACT

A variable area fan nozzle actuation ("VAFN") system is disclosed. The VAFN system may include an electrohydrostatic actuator ("EHA") arranged to translate a VAFN panel relative to a translating sleeve. An electrical coupling may extend between a translating sleeve associated with the VAFN system and the fixed structure. The electrical coupling may be movable so that as the translating sleeve and fixed structure move relative to each other, power may be provided to the EHA by a wiring harness extending across the space between the translating sleeve and the fixed structure and connecting the EHA to an EHA power source.

8 Claims, 9 Drawing Sheets

(51) Int. Cl.
*F15B 7/06* (2006.01)
*F15B 21/00* (2006.01)

(56) References Cited

U.S. PATENT DOCUMENTS

| | | |
|---|---|---|
| 5,074,495 A | 12/1991 | Raymond |
| 5,575,150 A | 11/1996 | Vieten et al. |
| 5,806,302 A | 9/1998 | Cariola et al. |
| 6,688,099 B2 | 2/2004 | Lair |
| 6,796,120 B2 | 9/2004 | Franchet et al. |
| 6,820,410 B2 | 11/2004 | Lair |
| 6,848,651 B2 | 2/2005 | Christensen |
| 6,938,408 B2 | 9/2005 | Lair |
| 6,983,588 B2 | 1/2006 | Lair |
| 7,127,880 B2 | 10/2006 | Lair et al. |
| 7,249,735 B2 | 7/2007 | Amorosi et al. |
| 7,513,112 B2 | 4/2009 | Sato et al. |
| 8,186,634 B2 * | 5/2012 | Chen .......... H02G 3/0456 248/298.1 |
| 8,875,486 B2 | 11/2014 | Roberts |
| 9,057,343 B2 | 6/2015 | McKay et al. |
| 10,030,608 B2 * | 7/2018 | Roberts .......... H02G 11/006 |
| 2003/0077183 A1 | 4/2003 | Franchet et al. |
| 2005/0086927 A1 | 4/2005 | Lair et al. |
| 2006/0038088 A1 | 2/2006 | Dodson |
| 2007/0209357 A1 | 9/2007 | Sato et al. |
| 2011/0192135 A1 | 8/2011 | McKay et al. |
| 2011/0277448 A1 | 11/2011 | Roberts |
| 2014/0183306 A1 * | 7/2014 | Chen .......... H05K 7/1491 248/70 |

OTHER PUBLICATIONS

Requirement for Restriction/Election Issued in U.S. Appl. No. 14/713,961 dated Jun. 21, 2017.

Notice of Allowance Issued in U.S. Appl. No. 14/713,961 dated Mar. 26, 2018.

* cited by examiner

VARIABLE AREA FAN NOZZLE ACTUATION SYSTEM

CROSS REFERENCE TO RELATED APPLICATIONS

This application is a divisional of, and claims priority to, and the benefit of U.S. patent application Ser. No. 14/713,961, filed on May 15, 2015, and entitled "VARIABLE AREA FAN NOZZLE ACTUATION SYSTEM" which is incorporated by reference herein in its entirety.

FIELD

The present disclosure relates to a variable area fan nozzle ("VAFN"), and more specifically, to a VAFN actuation system.

BACKGROUND

Prior translating VAFNs may be actuated using various actuators. However, such actuators typically have supporting plumbing and/or complex wiring arrangements, and thus contribute significant system weight and complexity. Moreover, such wiring may be subject to wear and fatigue. Furthermore, various translating VAFNs may have gearboxes, flexible drive shafts, telescopic couplings and screw drives further contributing significant system weight and complexity.

SUMMARY

In various embodiments, an electrical coupling is disclosed. The electrical coupling may include a jointed arm having a first portion and a second portion pivotably joined together by a pivotable joint and configured to extend between a fixed structure and a translating sleeve, and a guide system disposed in slidable mechanical contact with at least one of the first portion or the second portion and configured to support the jointed arm.

In various embodiments, a variable area fan nozzle ("VAFN") actuation system is disclosed. The VAFN may include a first electro-hydrostatic actuator ("EHA") configured to extend between a translating sleeve and a VAFN panel, and an electrical coupling configured to extend between a fixed structure and the translating sleeve. The electrical coupling may include a wire harness configured to connect the first electro-hydrostatic actuator to an EHA power source, a jointed arm configured to support the wire harness, and a guide system configured to support the jointed arm.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

In various embodiments, a VAFN may be configured to adjust the nozzle cross-section of the bypass duct by translating forward and aft (e.g., to stow and deploy), in a known manner. For instance, a translating sleeve may translate forward and aft relative to a fixed structure. The VAFN panel may travel forward and aft relative to the translating sleeve. Thus the VAFN panel may travel forward and aft relative to the fixed structure. In this regard, the VAFN panel may be configured to adjust flow from the fan through the bypass duct by controlling the exhaust area of the bypass duct.

As already described, prior VAFN actuation systems comprise hydraulic actuators to translate a translating sleeve, as well as actuators to stow and deploy the VAFN panel. Such a VAFN actuation system would also include plumbing and supporting hardware to enable the actuators. Moreover, this disclosure presents various features to provide and support electrical wiring for an electro-hydrostatic actuator. For instance, features are presented whereby electrical wiring may be supported between the fixed structure and the translating sleeve as the translating sleeve and/or VAFN panel move.

Figure 1:
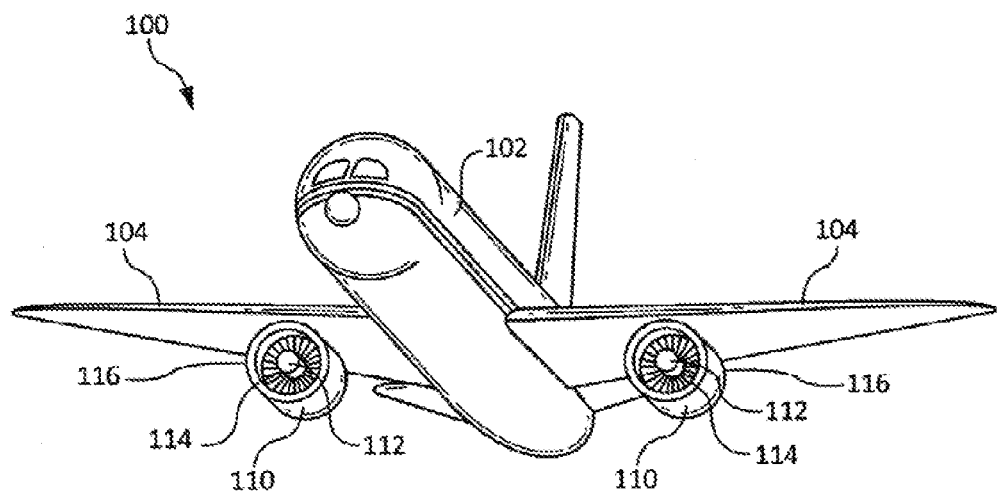
FIG. 1 depicts various aspects of an aircraft having engines with variable area fan nozzle actuation systems, according to various embodiments.

In various embodiments and with reference to FIG. 1, an aircraft 100 may comprise a fuselage 102 and a pair of wings 104. Propulsion system 110 (e.g., a turbofan jet engine with a nacelle assembly) may be mounted on the underside of wing 104. Propulsion system 110 may be configured to provide forward thrust and/or propulsion for aircraft 100.

In various embodiments, propulsion system 110 may comprise an engine including an engine core 112 and a fan 114, a pylon, and a nacelle 116 (e.g., a nacelle assembly and/or a nacelle package). Nacelle 116 may include two hemispheres (e.g., a first hemisphere or right hemisphere and a second hemisphere or left hemisphere). The two hemispheres may be joined together to surround engine core 112 and fan 114.

Figure 2:
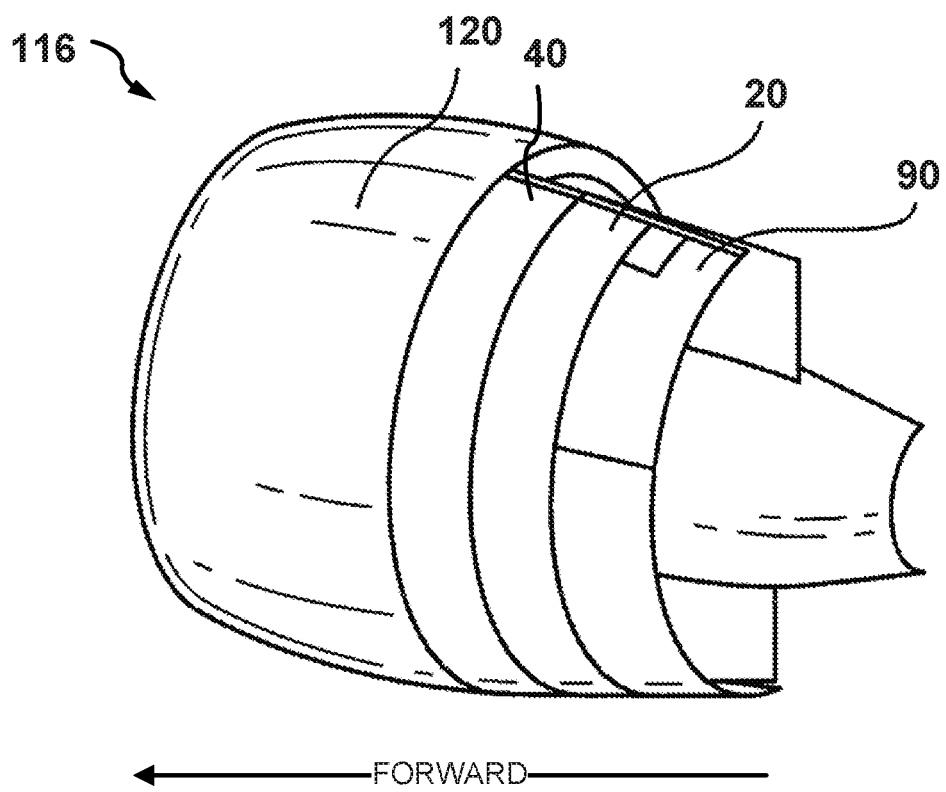
FIG. 2 depicts various aspects of a nacelle with a variable area fan nozzle actuation system, according to various embodiments.

In various embodiments and with reference to FIGS. 1 and 2, each hemisphere of nacelle 116 may comprise a fan cowl 120, fixed structure 40, a translating sleeve 20 which forms part of a thrust reverser system and moves between a stowed and deployed position in a known manner, and a VAFN panel 90 which travels forward and aft relative to the translating sleeve (and thus, the fixed structure) and is configured to adjust flow from the fan through the bypass duct by controlling the exhaust area of the bypass duct. Fan cowl 120 may be configured to surround fan 114 and define a portion of the outer surface of the nacelle. The translating sleeve 20 and/or VAFN panel 90 may be capable of being actuated forward and aft in response to activation of the thrust reverser system during, for example, a landing event. In this regard, translating sleeve 20 may be configured to actuate from its stowed position aft to a deployed position to expose thrust reverser system components (e.g., a cascade array) when the thrust reverser system is activated and the VAFN panel may be configured to actuate from its stowed position aft to adjust flow from the fan through the bypass duct by controlling the exhaust area of the bypass duct.

In various embodiments, fan 114 may draw and direct a flow of air into and through propulsion system 110. Aft of the fan 114, the air is divided into two principal flow paths, one flow path through engine core 112, and another flow path through a bypass air duct. The engine core flow path is directed into engine core 112 and initially passes through a compressor that increases the air flow pressure, and then through a combustor where the air is mixed with fuel and ignited. The combustion of the fuel and air mixture causes a series of turbine blades at the rear of engine core 112 to rotate, and to drive the engine's rotor and fan.

The bypass air may exit the bypass air duct at the aft end of the nacelle for thrust. In turbofan engines, the bypass flow typically provides a large percentage of the thrust for an aircraft. Moreover, the exhaust area of the bypass duct is generally sized for cruise conditions to provide enhanced operating efficiency. The longest portion of the duty cycle of propulsion system 110 is likely a cruise mode, which may thus drive the sizing of the exhaust nozzle area. However, a VAFN system may increase the overall efficiency of the aircraft by creating an adjustable bypass duct exhaust nozzle area to increase the operating efficiency or operating margin or stability of propulsion system 110 in non-cruise operating scenarios (e.g., take-off, climb, and descent).

In various embodiments, a translating sleeve 20 may be installed adjacent to the fixed structure 40. In this regard, translating sleeve 20 may be installed aft of and proximate to fixed structure 40. Translating sleeve 20 may be configured to actuate aft. A VAFN panel 90 may be installed adjacent to the translating sleeve 20. The VAFN panel 90 may be configured to actuate aft. The VAFN panel 90 may be configured to adjust, enlarge, control and/or otherwise modify the exhaust nozzle area of the bypass duct in response to actuating aft.

Figure 3:
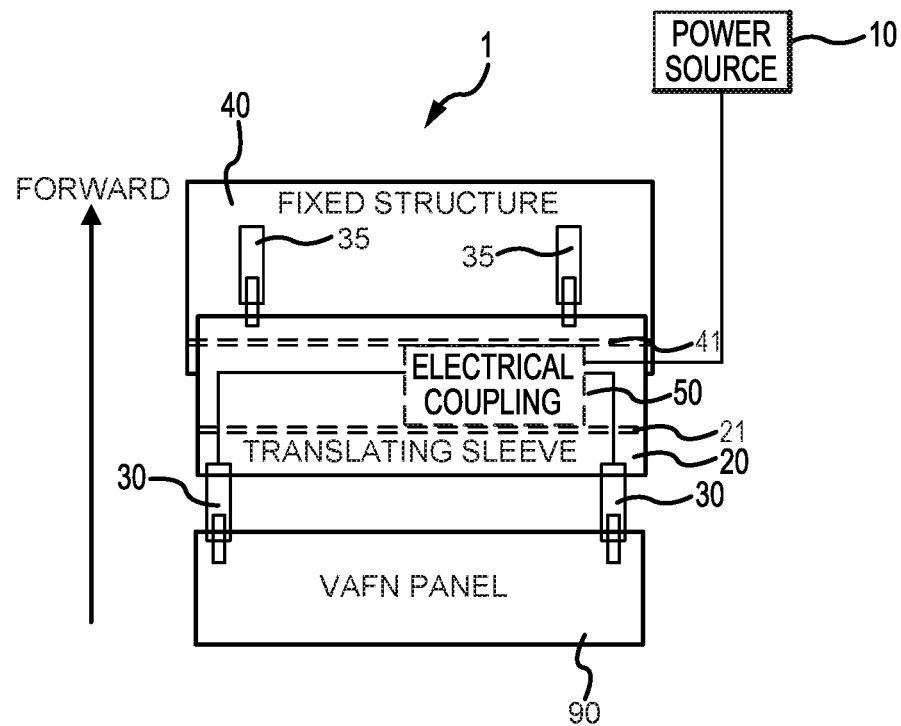
FIG. 3 depicts various aspects of a variable area fan nozzle actuation system having a first electrohydrostatic actuator and a second electrohydrostatic actuator, according to various embodiments.
Figure 4:
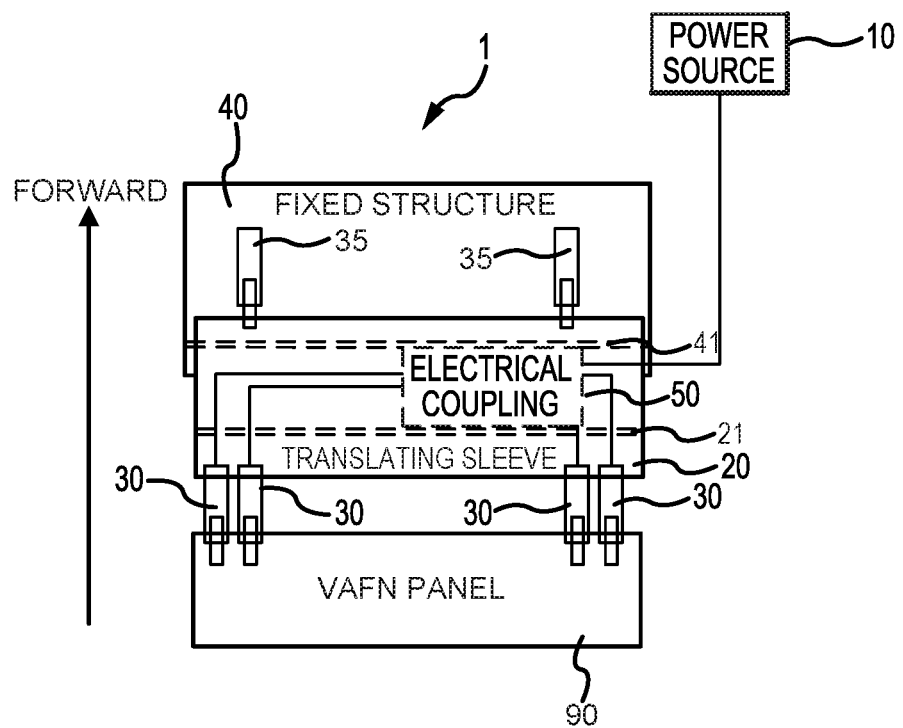
FIG. 4 depicts various aspects of a variable area fan nozzle actuation system having a first electrohydrostatic actuator, a second electrohydrostatic actuator, a third electrohydrostatic actuator, and a fourth electrohydrostatic actuator, according to various embodiments.

In various embodiments and with reference to FIG. 3, the VAFN panel 90 may be actuated by two electro-hydrostatic actuators 30 (e.g., two EHAs 30) such as a first EHA and a second EHA. With reference to FIG. 4, the VAFN panel 90 may be actuated by four EHAs 30, such as a first EHA, a second EHA, a third EHA, and a fourth EHA, arranged into pairs to provide redundancy. In further embodiments, the VAFN panel 90 may be actuated by a single EHA 30, or any number of EHAs 30. The EHA 30 may be configured to actuate VAFN panel 90 forward and aft to control, modify, or change the exhaust nozzle area of the bypass duct.

In various embodiments and with reference to FIGS. 3 and 4, the translating sleeve 20 may be actuated by two translating sleeve actuators 35. A translating sleeve actuator may comprise an electro-hydrostatic actuator, or a hydraulic actuator, or an electrical and/or mechanical actuator, or any actuator as desired. The translating sleeve 20 may be actuated by a single translating sleeve actuator 35, or any number of translating sleeve actuators 35. The translating sleeve actuator 35 may be configured to actuate translating sleeve 20 forward and aft, in various embodiments, further effecting the translating of the VAFN panel 90 forward or aft.

Figure 5:
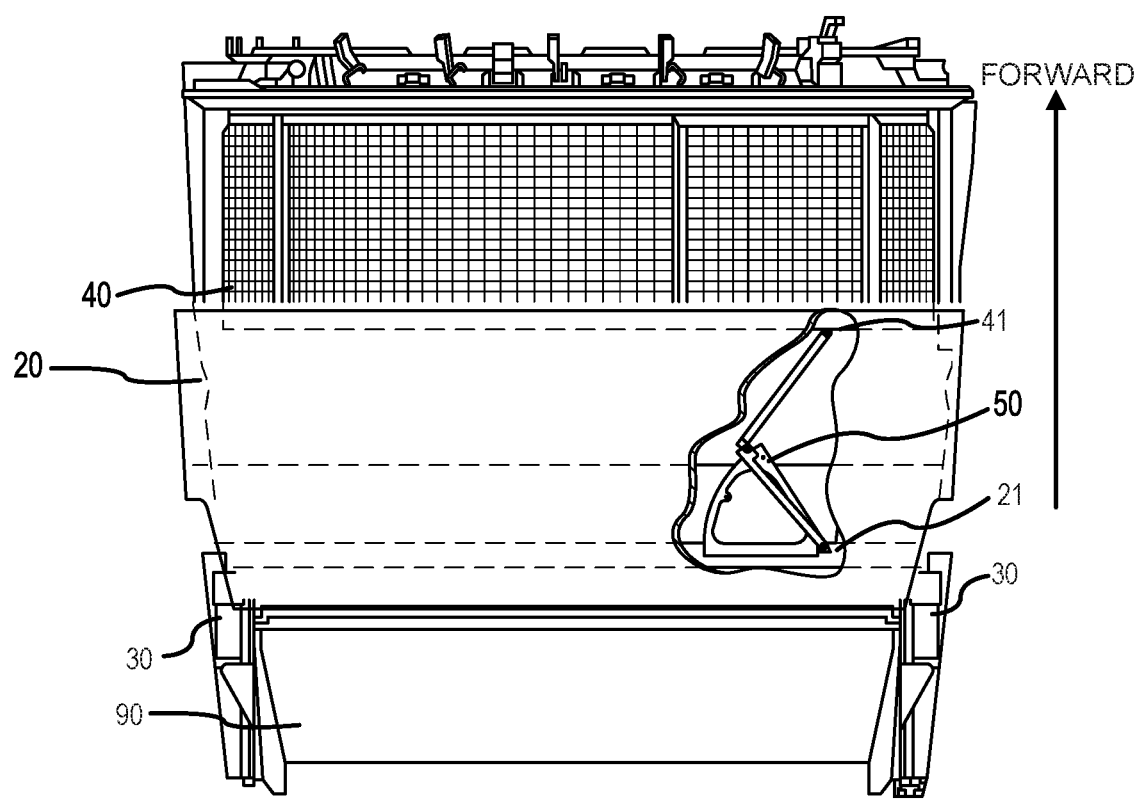
FIG. 5 depicts an electrical coupling of a variable area fan nozzle actuation system disposed between a translating sleeve and a fixed structure, according to various embodiments.

With reference to both FIGS. 3, 4, a VAFN actuation system 1 may comprise an EHA power source 10, a translating sleeve 20 as discussed, one or more EHA 30 as discussed, one or more translating sleeve actuator 35 as discussed, a fixed structure 40 as discussed, a VAFN panel 90 as discussed, and an electrical coupling 50 configured to provide electrical connectivity between the EHA 30 and the EHA power source 10 across the moving space between fixed structure 40 and the translating sleeve 20. For instance, with reference to FIG. 5, an electrical coupling 50 is disposed between the fixed structure 40 and the translating sleeve 20 and the electrical coupling 50 at least one of expands or contracts in response to the translating of the translating sleeve 20.

Figure 6:
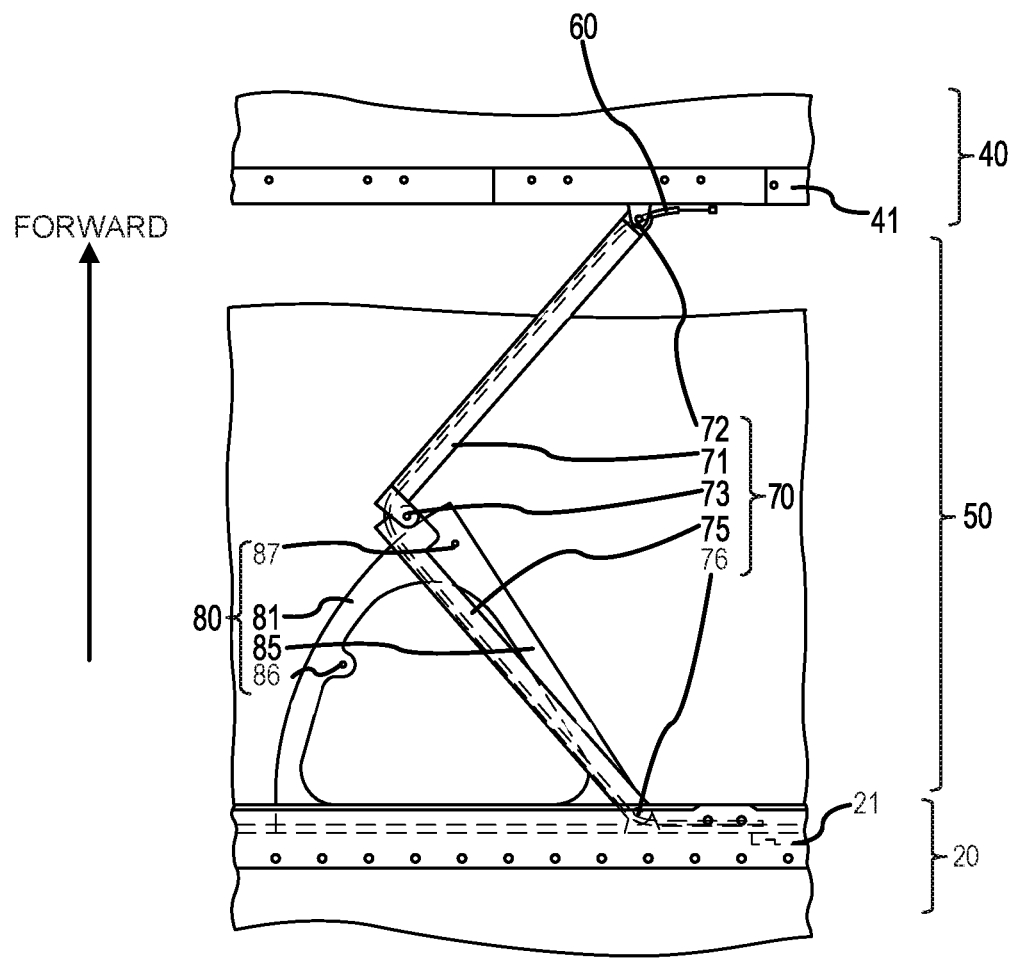
FIG. 6 depicts a detailed view of an electrical coupling of a variable area fan nozzle actuation system, according to various embodiments.

Directing attention now to FIG. 6, various aspects of a VAFN actuation system 1 (FIG. 3) are disclosed in further detail. The fixed structure 40 may further comprise a cascade ring 41. The cascade ring 41 may comprise a ring section disposed on the fixed structure 40, such as proximate to the aft end of the fixed structure 40 (e.g., closer to the aft end than the forward end), or such as at the aft end of the fixed structure 40, and coincident with the curve of the fixed structure 40. The cascade ring 41 may provide an attachment point for various aspects of the electrical coupling 50 discussed further herein.

The translating sleeve 20 may further comprise an I-frame 21. An I-frame 21 may comprise a curved fixture disposed on the translating sleeve 20, such as proximate to the end of the translating sleeve 20 closest to the fixed structure 40 (e.g., closer to the this end than the opposing end), or such as at the end of the translating sleeve 20 closest to the fixed structure 40 and may provide an attachment point for various aspects of the electrical coupling 50 discussed further herein.

The electrical coupling 50 may comprise various features. For instance, the electrical coupling may comprise a wiring harness 60, a jointed arm 70, and a guide system 80. The jointed arm 70 may provide moveable support for the wiring harness 60, wherein the wiring harness 60 extends from the translating sleeve 20 to the fixed structure 40 so that the EHA 30 and EHA power source 10 may be maintained in electrical connectivity even as the translating sleeve 20 and the fixed structure 40 move relative to each other. The guide system 80 may provide additional support to the jointed arm 70, such as providing strength to the jointed arm 70 along various points of its range of motion.

Figure 7:
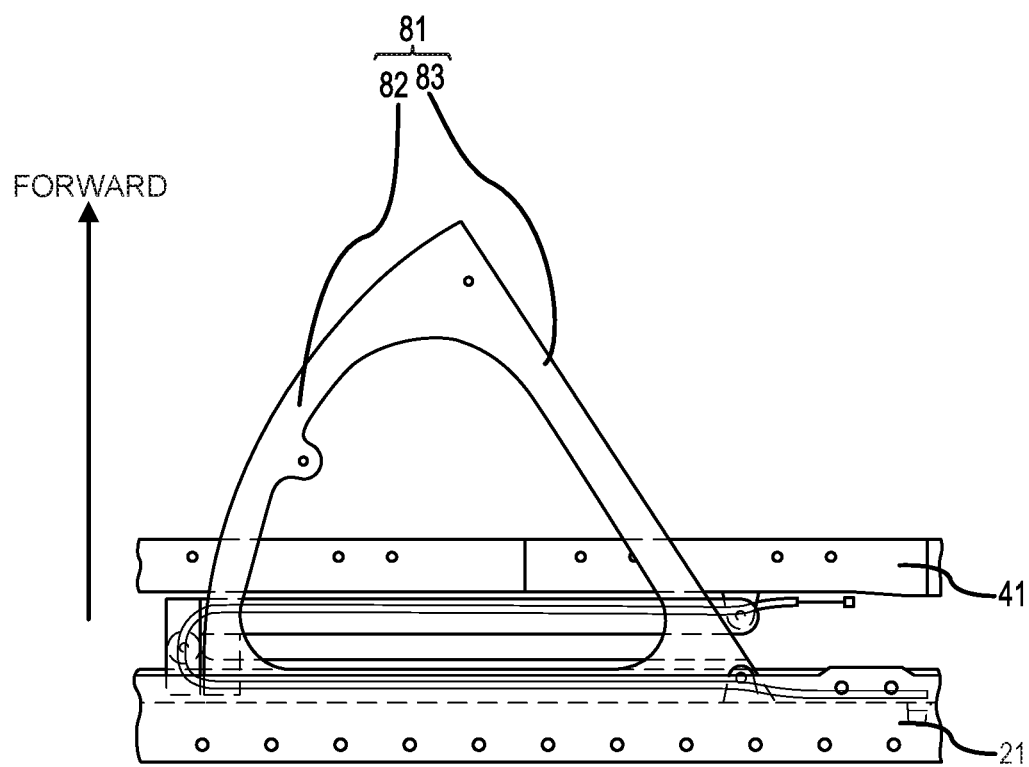
FIG. 7 depicts a guide system of an electrical coupling, according to various embodiments.
Figure 8:
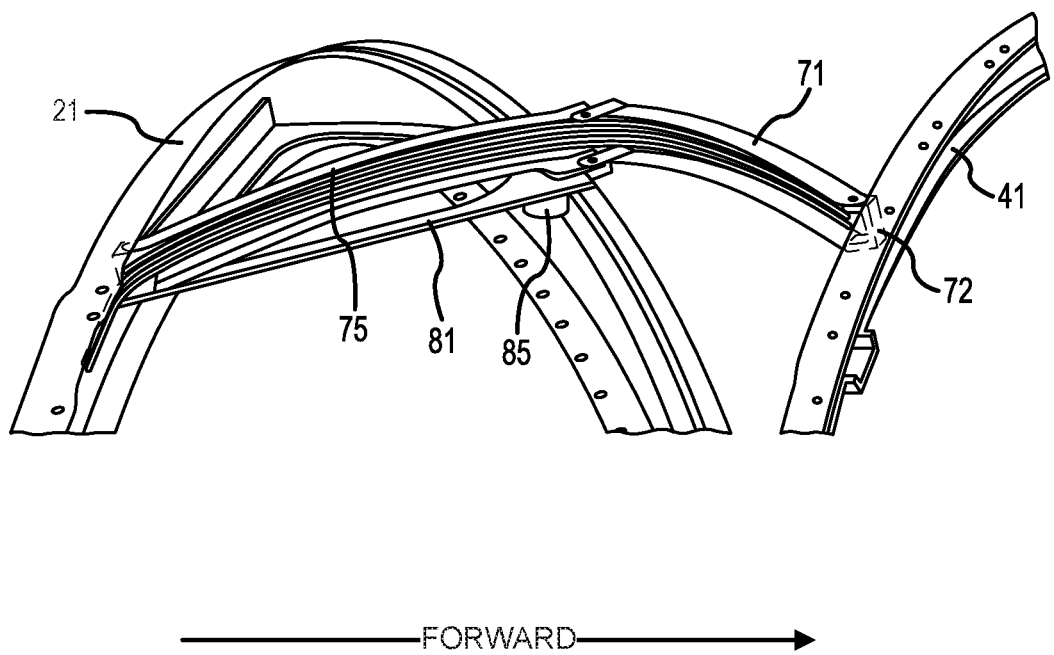
FIG. 8 depicts an isometric view of an electrical coupling of a variable area fan nozzle actuation system, according to various embodiments.
Figure 9:
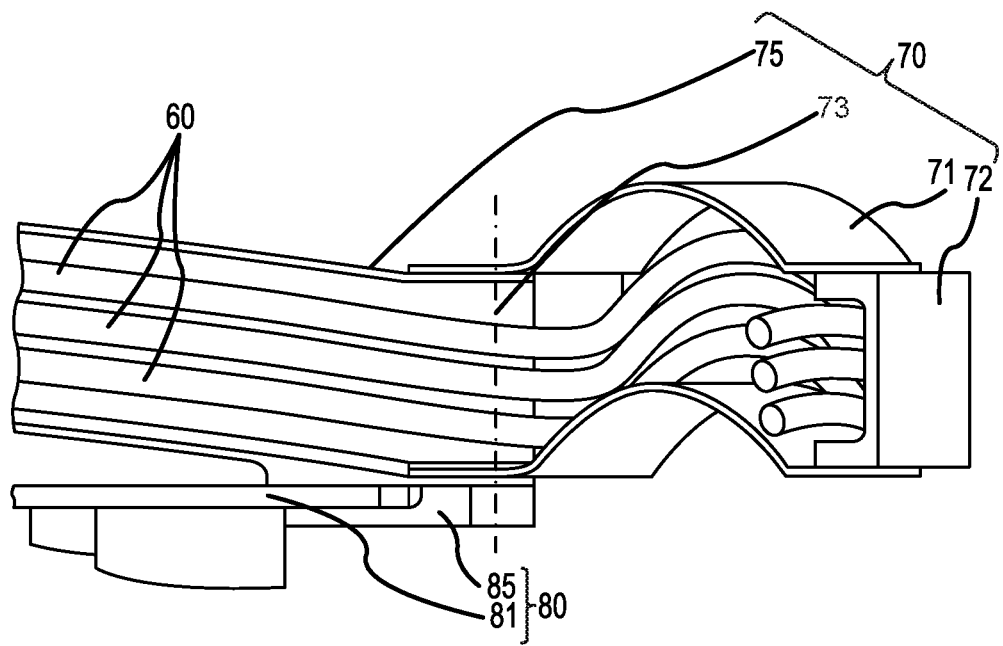
FIG. 9 depicts a side view of an electrical coupling of a variable area fan nozzle actuation system, according to various embodiments.

With ongoing reference to FIG. 6 and further reference to FIGS. 7-9, the jointed arm 70 may comprise a first portion 71. First portion 71 may comprise a structure such as a C-channel pivotally attached to a second portion 75 at a pivotable joint 73 and pivotally attached to a cascade ring 41 of a fixed structure 40, such as by a cascade ring mounting bracket 72. For instance, the first portion 71 may comprise a cascade ring mounting bracket 72 disposed at an end opposite the pivotable joint 73 (e.g., opposite second portion 75). The cascade ring mounting bracket 72 may be attached to the cascade ring 41 and may comprise a pivot whereby the juncture of the first portion 71 to the cascade ring 41 is accomplished. For instance, the cascade ring mounting bracket 72 may comprise a U-shaped bracket received at least partially within the C-channel of the first portion 71.

The jointed arm 70 may comprise a second portion 75. The second portion 75 may comprise a structure such as a C-channel pivotably attached to the first portion 71 at pivotable joint 73 and pivotally attached to the I-frame 21 at pivotable joint 76 of the second portion 75 to the translating sleeve 20 (such as at I-frame 21). Thus, as the translating sleeve 20 and the fixed structure 40 translate relative to one another, the jointed arm 70 may pivot at the pivotable joint 73 of the first portion 71 and the second portion 75, thus expanding and contracting in response to the expansion and contraction of the space between the fixed structure 40 and the translating sleeve 20.

The guide system 80 may comprise a guide plate 81. The guide plate 81 may comprise a flange extending from the I-frame 21 of the translating sleeve 20 toward the fixed structure 40 (see also FIG. 7). The guide plate 81 may be attached to the translating sleeve 20 at first attachment point 86 and/or second attachment point 87. The guide plate 81 may provide support to the jointed arm 70 across all or part of its range of motion. For instance, the guide plate 81 may comprise a curved portion 82 and a reinforcing portion 83. The curved portion 82 may comprise an arced flange extending away from the I-frame 21 lying coincident with the path of travel of the pivotable joint 73 of the jointed arm 70, thereby supporting the junction of the jointed arm 70. The reinforcing portion 83 may comprise a linear flange, such as extending from the curved portion 82 and back toward the I-frame 21. The reinforcing portion 83 may provide further support to the curved portion 82, and may provide further support to at least a portion of the second portion 75 of the jointed arm 70.

The guide system 80 may comprise a guide fitting 85. A guide fitting 85 may comprise a bracket configured to hold a portion of the jointed arm 70 in slidable mechanical contact with the guide plate 81. For instance, the guide fitting 85 may comprise a bracket attached to the second portion 75 of the jointed arm 70 and sandwiching a portion of the guide plate 81 against the second portion 75 of the jointed arm 70. Thus, as the jointed arm 70 moves, the second portion 75 may slide relative to the guide plate 81, but may be maintained in mechanical contact with the guide plate 81. In this manner, vibration and/or side loading of the jointed arm 70 may be ameliorated.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electrical coupling comprising:
   a jointed arm comprising a first portion and a second portion pivotably joined together by a pivotable joint and configured to extend between a first structure and a translating sleeve; and
   a guide system disposed in slidable mechanical contact with at least one of the first portion or the second portion and configured to support the pivotable joint of the jointed arm;
   wherein the guide system comprises:
      a guide fitting; and
      a guide plate,
         wherein the guide fitting comprises a bracket retaining the second portion of the jointed arm in slidable mechanical contact with the guide plate, and
         wherein the guide plate supports the pivotable joint of the jointed arm.

2. The electrical coupling according to claim 1, further comprising a wire harness extending through the jointed arm.

3. The electrical coupling according to claim 1, wherein the first portion comprises a c-channel.

4. The electrical coupling according to claim 1, wherein the first portion comprises a cascade ring mounting bracket attachable to the fixed structure.

5. The electrical coupling according to claim 4,
   wherein the fixed structure comprises a cascade ring, and
   wherein the cascade ring mounting bracket is pivotably attachable to the cascade ring.

6. The electrical coupling according to claim 1, wherein the second portion is pivotably attachable to the translating sleeve.

7. The electrical coupling according to claim 6, wherein the translating sleeve comprises an I-frame, and wherein the second portion is pivotably attachable to the I-frame.

8. The electrical coupling according to claim 1, wherein the guide plate comprises:
   a curved portion supporting the pivotable joint of the jointed arm; and
   a reinforcing portion supporting the curved portion.

* * * * *